United States Patent [19]

Hemels et al.

[11] Patent Number: 4,503,115

[45] Date of Patent: Mar. 5, 1985

[54] PLATE-SHAPED MOLDED ARTICLE AND PROCESS FOR ITS PREPARATION AND USE

[75] Inventors: Martinus H. Hemels, Weert; Gerardus W. Schuren, Kelpen, both of Netherlands

[73] Assignee: Hoechst Aktiengesellschaft, Frankfurt, Fed. Rep. of Germany

[21] Appl. No.: 444,198

[22] Filed: Nov. 23, 1982

[30] Foreign Application Priority Data

Dec. 4, 1981 [DE] Fed. Rep. of Germany ....... 3147989

[51] Int. Cl.$^3$ .............................................. D04H 1/08
[52] U.S. Cl. ..................... 428/281; 264/112; 264/113; 264/120; 264/122; 428/280; 428/283; 428/284; 428/286; 428/290; 428/325; 428/326; 428/327; 428/406; 428/407; 428/535; 428/537.1; 428/920
[58] Field of Search .............. 428/280, 281, 282, 283, 428/284, 289, 290, 298, 326, 327, 903, 243, 249, 218, 171, 172, 151–154, 920, 286, 325, 406, 407, 535, 537; 264/120, 122, 112, 113

[56] References Cited

U.S. PATENT DOCUMENTS

| | | | |
|---|---|---|---|
| 2,464,301 | 3/1949 | Francis | 428/171 |
| 2,537,126 | 1/1951 | Francis | 428/171 |
| 2,573,956 | 11/1951 | Daniel, Jr. et al. | 117/76 |
| 2,582,961 | 1/1952 | Burnell et al. | 117/136 |
| 2,926,154 | 2/1960 | Keim | 260/29.2 |
| 3,372,131 | 3/1968 | Rohlfs et al. | 260/17.3 |
| 3,673,020 | 6/1972 | De Jaeger | 156/622 |
| 3,832,316 | 8/1974 | Juneja | 260/29.4 R |
| 3,887,511 | 6/1975 | Junega | 260/294 R |
| 4,010,296 | 3/1977 | Oberley | 427/393 |
| 4,154,882 | 5/1979 | Ungor et al. | 428/172 |
| 4,158,713 | 6/1979 | Degens | 428/280 |
| 4,271,221 | 6/1981 | Hosmer | 428/172 |
| 4,379,193 | 4/1983 | Hunt | 428/284 |

FOREIGN PATENT DOCUMENTS

| | | |
|---|---|---|
| 2657924 | 6/1978 | Fed. Rep. of Germany . |
| 865727 | 4/1961 | United Kingdom . |
| 908205 | 10/1962 | United Kingdom . |
| 984170 | 2/1965 | United Kingdom . |
| 1015803 | 1/1966 | United Kingdom . |
| 1052667 | 12/1966 | United Kingdom . |
| 1433464 | 4/1976 | United Kingdom . |

OTHER PUBLICATIONS

Utsumi, S., "Water-Resistant Particle Boards," ABIPC, vol. 47, No. 9, (Mar. 1977), p. 1026, European Search Report.

Primary Examiner—James J. Bell
Attorney, Agent, or Firm—Schwartz, Jeffery, Schwaab, Mack, Blumenthal & Koch

[57] ABSTRACT

Disclosed is a decorative molded article, for example, in the form of a flat plate for structural application such as constructional panels, which comprises a core of wood and/or cellulose fibers, pressed together with a thermosetting synthetic resin under conditions suitable for hardening the resin. The resin content amounts to more than 150 and up to 900 g per 1000 g of dry fibers, and the density of the molded article is between 900 to 1600 kg/m$^3$. A decorative layer is placed onto one or both surfaces of the molded article, for example, a decorative foil or a coating. A process for producing and also using the molded article is also described.

27 Claims, 1 Drawing Figure

U.S. Patent  Mar. 5, 1985  4,503,115
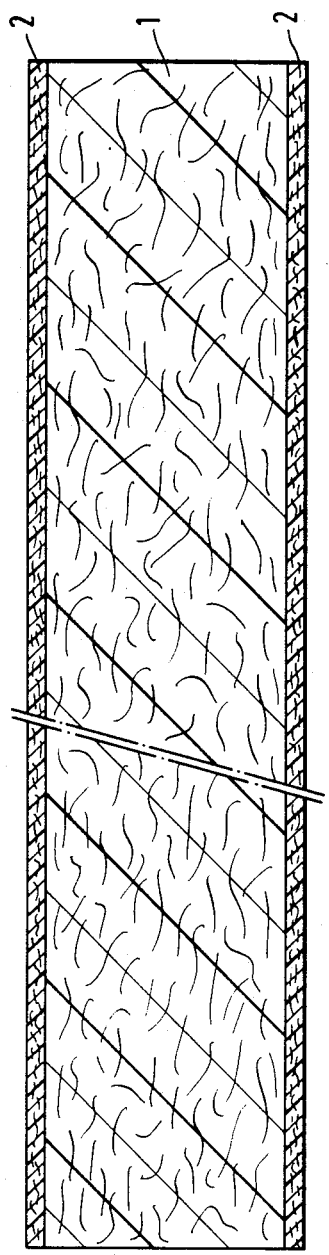

PLATE-SHAPED MOLDED ARTICLE AND PROCESS FOR ITS PREPARATION AND USE

BACKGROUND OF THE INVENTION

The present invention relates to a decorative, and especially a plate-shaped molded article, consisting of a core of a fiber-containing material, coated with a thermosetting synthetic resin, which is then heat-hardened and pressed, and finally a decorative layer is applied to the surface or surfaces of the core.

The invention relates also to a process for the preparation of a molded article of this type, wherein one or several layers of a fibrous material are arranged above each other, are provided with a thermosetting synthetic resin, and are pressed together at an elevated temperature to form the core of the molded article, whereby the synthetic resin is hardened, and the surface or surfaces of the core are provided with a decorative layer during the heat-treatment or subsequent to it.

The invention further relates to the use of the decorative, preferably plate-shaped molded article.

To produce the known decorative laminated sheets, generally kraft paper is first impregnated with a low molecular weight duroplastic resin and dried at 120° to 160° C., whereby the resin is partially hardened. A number of these pretreated papers are stacked upon one another and form the core of the laminated plate which is to be made. Onto one or both of the outer paper layers of the stack, usually a decorative layer of paper or possibly a covering paper sheet are placed, which usually are also treated in an appropriate manner with a duroplastic resin. The stack is hardened at a temperature of 120° to 180° C. under a pressure of at least 70 bar in a stationary press installation. In the course of this process, the resins flow and are hardened, whereby the individual layers of the core and the surface layers are shaped into a non-melting, rigid cross-linked sealed product. The laminated plate obtained is used primarily in the furniture and construction industries.

This known laminated plate has the disadvantage of a relatively low dimensional stability under varying climatic conditions. With varying atmospheric humidities and changes in temperature, the laminated plate expands or shrinks in the longitudinal direction and particularly strongly transverse to the longitudinal direction. The originally flat laminated plate may warp upon absorbing moisture and attain a concavely curved surface, or else its surface may exhibit a structure corrugated in cross-section after the absorption of moisture.

This dimensional stability, which is inadequate for constructional applications, originates in the structure of the core of this known laminated plate. The kraft papers forming the core consist of fibers arranged up to 60 to 80% in the longitudinal direction and up to 40 to 20% in the transverse direction, with respect to the web of the paper. Consequently, the properties of these papers are different in these two directions. This orientation of the paper, which is particularly strong in the longitudinal direction of the web of paper, is further enhanced during the impregnation of the paper web with thermosetting resins dissolved in water or organic solvents and the subsequent drying, if the wet kraft paper is exposed to tensile stress in the longitudinal direction. This relatively strong orientation in the longitudinal direction has the effect that the resulting laminated plate based on kraft paper exhibits dimensional variations that differ in the longitudinal and transverse directions under varying climatic conditions.

Kraft papers are not homogeneous in relation to their thickness either. For manufacturing reasons, their top side has a lower density than their screen side. Complete homogeneity is for this reason fundamentally not achievable.

Furthermore, in the conventional process the complete impregnation and wetting of the individual paper fibers is difficult to control because of the different density of the webs of paper and because of the penetration properties for the resin solutions which vary for this reason. Fibers which are not coated with the resins may cause blister formation in the core when used in wet, humid or exterior applications.

Beyond this, as the result of the stratified configuration of the plate and the lack of homogeneity of the paper web, a relatively slight and partially uncertain reinforcement between the individual core layers exists, whereby the transverse tensile strength may be rendered relatively low and failures may occur under transverse stress. In the course of long-term fatigue exposures in the outside atmosphere or in atmospheric test cabinets or in the case of weathering tests, this inhomogeneity may lead to the splitting of the core in peripheral areas.

The application of these known laminated plates in construction uses, wherein the material is exposed to varying temperature and humidity effects, involves an additional expense for these different reasons.

In addition, sheets of wood chips and wood fibers with a matrix of aminoplastic or phenolic resins or cement or even plywood sheets are known, which have uniform density and are therefore suitable for exterior applications or inside applications where moisture is a problem. However, compared with laminated plates, these require maintenance; due to the strong absorption of water by the surface which is not sealed, they must be regularly treated on all sides, they exhibit strong swelling upon absorption of water with increases in thickness, they are not decorative and they have low stability.

A decorative, plate-shaped molded article made of wood chips has also been described (DE-OS No. 19 12 300), which contains a phenolic resin matrix, with the resin content amounting to 5 to 15% by weight relative to the dry wood chips. This molded article is likewise unsatisfactory with respect to weather resistance. It is observed that, in weatherability testing, strong absorption of water and consequent peripheral swelling and core splitting take place already after a few weeks, and as a result, cracking on the surface occurs.

SUMMARY OF THE INVENTION

It is therefore an object of the present invention to provide an improved decorative molded article of the aforementioned type.

It is particularly an object of the invention to provide a decorative molded article which does not exhibit the aforecited disadvantages, but rather has equivalent and higher dimensional stability in the longitudinal and transverse directions under the effect of varying climatic conditions, such as, for example, atmospheric humidity and an increased tensile strength in the transverse direction.

Another object of the invention is to provide such a decorative molded article which has only a slight tendency of corrugate or curve under the effect of water or to change its dimensions.

Still another object of the invention is to provide a decorative molded article which possesses a higher bending strength, higher tensile strength, higher transverse tensile strength, better dimensional stability and a reduced absorption of water, compared to the known molded articles of wood chips and wood fibers.

It is also an object of the invention to provide a molded article which has a homogeneous structure and isotropic properties in the longitudinal and transverse directions, together with a surface sealed on all sides, which results in a molded article suitable for processing in a simple manner, for example, by means of milling devices.

A further object of the invention is the provision of a process for producing the molded articles according to the invention.

Still another object of the invention resides in providing improved end use articles utilizing the molded articles according to the invention.

In accomplishing the foregoing objects, there has been provided according to the present invention a decorative molded article, comprising a core of a fiber containing material comprised of wood or cellulose fibers which are coated with a thermosetting synthetic resin up to a content of at least about 150 g and not more than about 900 g of resin per 1000 g of dry fibers; and a decorative layer on at least one surface of the core, wherein the density of the molded article is between about 900 and 1600 kg/m$^3$. Preferably, the resin content is between about 150 and 600 g of resin per 1000 g of dry fibers, and the density of the molded article is between about 1100 and 1500 kg/m$^3$. The core may contain up to about 50% by weight of organic synthetic fibers.

In accordance with another aspect of the invention, there has been provided a process for producing a molded article as described above, comprising the steps of coating the wood or cellulose fibers with from about 15 to 90% by weight of the thermosetting synthetic resin in an uncured state; forming the coated fibers into a randomly deposited non-woven web-like mat; predensifying the web-like mat; and heating and pressing the predensified mat under conditions sufficient to harden the resin.

There has also been provided according to the invention a construction panel suitable for exterior application, comprising a molded article as defined above in the form of a substantially flat plate.

Further objects, features and advantages of the present invention will become apparent from the detailed description of preferred embodiments which follows, when considered togeter with the attached figure of drawing.

BRIEF DESCRIPTION OF THE DRAWING

The FIGURE of drawing is a cross-sectional view of a molded article according to the invention in the form of a plate or sheet.

DETAILED DESCRIPTION OF PREFERRED EMBODIMENTS

In the use of the molded articles, especially plates, as facade or cladding panels, the plates are exposed directly to weather effects and serve as a suspended facade panel, parapet panel, balcony panelling or roof shades.

It has been discovered that fibrous wood particles with relatively large amounts of thermosetting resins may be densified under high pressures and at high temperatures, so that a molded article—especially in the form of a plate—with a density of from about 900 to 1600 kg/m$^3$, in particular from about 1100 to 1500 kg/m$^3$, is produced which is characterized by a slight absorption of water, excellent dimensional stability, together with high bending and tensile strength.

In contrast to the known and aforedescribed sheet materials, the molded article obtained according to the invention displays excellent weather resistance under extreme conditions of climate variation, a good isotropy of its properties in the longitudinal and transverse directions and smooth, closed and nonporous surfaces on all sides.

Beyond this, the molded article has improved physical properties, for example, high strength, good impact behavior and no tendency to splinter. Chemical resistance and surface hardness are also excellent.

A molded article is herein defined as a laminar body having a surface configuration adapted to its application and which, for example, may have a bent shape. A molded article is in particular a sheet with an essentially flat surface.

The core layer consists of one or several layers of wood fibers and/or cellulose fibers. Advantageously, the proportion of the cellulose fibers is at most about 60% by weight. No improvement is noted with more than five layers. A continuous production process is readily effected with 1 to 3 layers.

The wood fibers are made of types of wood amenable to separation into fibers, for example, conifers, such as pines and firs, or deciduous trees, such as chestnut or beechnut. In addition to the wood and cellulose fibers, industrial wood-, paper- and cellulose-wastes, for example, wood flour or mechanical wood pulp may also be used; wastes of woodworking shops are similarly suitable. It is also possible to replace part of the wood fibers, cellulose fibers or wood wastes, preferably up to about 20% by weight by synthetic plastic waste materials, for example, in the form of fibers or granules. The wood is washed to remove traces of metal, rocks, or sand, and is then ground in a mill into wood chips.

The wood chips are softened in a digestor (steam boiler) with steam under a steam pressure of 1 to 10 bar for a few minutes and subsequently are comminuted into wood fibers, for example, between two moving disks.

The wood fibers decomposed in this manner are from about 0.3 to 20 mm long, have an average length of from about 0.5 to 3 mm and an average diameter of from about 0.025 to 0.05 mm. The diameter range is between about 0.01 and 1 mm as a function of the raw wood used and the conditions of decomposition. The length and the diameter of the cellulose fibers used are within the same dimensional range. During the fiber comminution with steam or immediately prior to the subsequent drying, the wood particles may be optionally treated with an alkaline formaldehyde solution, for example, in a steam treatment at 3 to 10 bar and a temperature of 80° to 180° C. This pretreatment yields sheets which are especially stable dimensionally and insensitive to water. The thin fibers at the outlet of the fiber cutting machine may be dried in a few seconds, for example. with a blower or with an open flame in a tubular dryer. In the wet state or after drying to a humidity content of 3 to 10%, the resin serving to bond the loose wood fibers is added.

The resin with which the fibers are impregnated is, for example, an epoxy resin, a phenol-formaldehyde resin, an aminoplast, such as a melamine-formaldehyde resin or a urea-formaldehyde resin or a cross-linkable acrylic resin or a polyurethane resin or a mixture of these resins or a mixed condensation resin.

Other suitable thermosetting resins are the condensation products of aliphatic polyamines or of polyamides, in particular of polyamidepolyamines with bifunctional halohydrins or their derivatives, such as, for example epichlorohydrin, such as those described, for example, in U.S. Pat. No. 2,926,154 and No. 2,573,956 or in British Pat. No. 865,727 and No. 908,205. Simple alkylene diamines or polyalkylenepolyamines may be considered as the polyamines; they are preferably reacted with epichlorohydrin. The polyamidepolyamines are condensation products of a saturated aliphatic dibasic acid, having 3 to 8 carbon atoms in its molecule, with a polyamine containing at least one secondary and two primary amino groups.

Particularly suitable is a phenol-formaldehyde resin or a melamine-formaldehyde resin. Especially advantageous, however, is the use of a synthetic resin, which even at elevated temperatures, such as, for example, 140° to 160° C., hardens at a relatively low rate (B-time is longer than 5 minutes, preferably not longer than 30 minutes, at 130° C.). The average molecular weight of the resin may be in the higher or lower range. Such phenol-formaldehyde resins are commercially available, for example, under the trademark PHENODUR, manufactured by Hoechst.

In another embodiment, the fibers are initially impregnated with a low molecular weight, slowly-hardening phenol-formaldehyde resin (PHENODUR PR 271), and optionally heated, without the complete hardening of the resin, after which a second, high molecular weight, slowly-hardening phenol-formaldehyde resin (PHENODUR VPR 45, same B-time) is applied to the fibers. Sheets made with these resins or combinations of resins show a particularly low absorption of water. The B-time is defined as the period of time in which the resin remains in the swellable and meltable B state, until it is converted by polycondensation into the nonswellable, nonmeltable and nonweldable C state.

To these resins, known non-flammable additives may be added, or alternatively, resins are used which by modifications of the molecular chain exhibit non flammable properties (described, for example, in U.S. Pat. No. 2,582,961, No. 3,372,131, No. 3,832,316, and No. 4,010,296, and in German Auslegeschrift No. 22 61 856). In an embodiment of this kind, the fibers are, for example, coated with a precondensed resin comprising di-cyandiamide-formaldehyde-phosphoric acid, melamine-formaldehyde-phosphoric acid or urea-formaldehyde-phosphoric acid as the first component and a precondensed phenol-formaldehyde resin as the second component. This resin mixture is then converted to the C state. As is known, the resins of the first component are prepared by precondensing the amino-formaldehyde component parts and adding phosphoric acid during or after this precondensation. Di-cyandiamide-formaldehyde resins with a phosphate component are commercially available, for example, under the trademark SKW-VP 130, manufactured by SKW Trostberg.

To improve the surface, melamine resins are used in the decorative layer, to give particularly good surface properties of the molded articles, in particular in relation to scratching resistance, light-fastness and chemical resistance.

The amount of resin applied to the fibers is from about 15 to 90% by weight (with respect to the weight of the fibers), in particular from about 15 to 60% by weight. The type and proportion of the resin determine the essential properties of the sheet material. The addition of the resin, i.e., the glueing, is effected by the direct addition of the resin in an aqueous, in particular alkaline solution or dispersion, or in an organic solvent in the outlet line of the fiber comminution unit or with conventional glueing mixers, for example, by blowing with compressed air dispersing nozzles. Advantageously, an electrostatically operating spray system or an "airless" spray system is used.

The adhesive-coated fibers are subsequently dried, for example, by means of hot air, to a residual moisture content of from about 2 to 15% by weight, preferably 4 to 10% by weight, whereby the resin is partially hardened or cured.

After drying, the fibers are stored or transported directly to the lay-down installation which deposits the fibers continuously and uniformly in a tangled layer, preferably over the entire width of an essentially horizontal conveyor belt, on which a web-like mat of material—the core of the sheet to be produced—is formed. The lay-down device consists, for example, of a distribution tube suspended in a pendulum motion over the shaping path. Following the continuous forming of the mat on the conveyor belt, for example, with strippers and distributors, in the form of belts, scrapers, brushes or rolls, the mat is preferably continuously prepressed and densified with a reduction in thickness, in a press installation at approximately 3 to 25 bar, preferably without preheating, and is substantially possibly coated with decorative foil on one or both sides, with the foil also being impregnated with a duroplastic resin, for example, a melamine resin. The predensified mat, provided possibly with decorative covering layers, is pressed and hardened at a temperature from about 120° to 200° C. and a pressure of from about 30 to 100 bar, in continuous or batch-type pressing installations. During the pressing process, the hardening of the resin results in a rigid, crosslinked homogeneous sheet material. The press time is a function of the thickness of the plate. The pressing apparatus used has a flat or structured pressing surface for the production of flat plates or a profiled pressing surface to produce plates with a profile-like configuration, for example, in the form of angles or corrugated plates.

The decorative plates or sheets have a density of from about 900 to 1600, in particular from about 1100 to 1500 kg/m$^3$ and a thickness of from about 0.5 to 100, in particular from about 2 to 40 mm, as a function of the amount of fibers layed down per square meter.

In principle, the decorative layers may be applied even after the pressing process, by laminating with synthetic resin or paper foil, or particularly advantageously by coating with organic or inorganic systems.

As a suitable organic system for the preferred preparation of the decorative layers after the pressing process, for example, a cross-linkable acrylic resin, a cross-linkable polyurethane resin, a cross-linkable epoxy resin or a cross-linkable melamine resin, may be used. These resins are applied to the plate after pressing by means of heat and/or pressure and advantageously contain a filler and/or coloring, for example, paint pigments to enhance the decorative effect. As a suitable inorganic system for the preparation of the decorative layers, there can be used a coating with water glass together with colorings, such as titanium oxide, zink sulfide or zink sulfate, with fillers such as quartz sand or glass balls.

By virtue of the excellent physical and decorative properties, particularly by high bending strength, high tensile strength and high transverse tensile strength, and because of the good dimensional stability, the low absorption of water and the isotropy in the longitudinal and transverse directions, the molded article of the invention is optimally suitable for applications as a self-supporting article or cladding structural element, in particular as panels in internal or external construction, for example, in the form of a wet cell or facade panelling.

The invention will be explained in more detail by means of the examples which follow. The properties of the plates described therein were determined after a storage of 8 days in a standard atmosphere (23° C., 50% relative humidity) and are listed in the appended table.

EXAMPLE 1

Debarked tree parts of comminutable fir trees are ground into wood chips in a chopping mill. Subsequently, these particles are placed in a steam boiler (digestor) with a steam pressure of 6 bar for a few minutes, to be softened. The digested wood chips are beat into fibers in a mill.

The loose wood fibers obtained are now impregnated with a phenol-formaldehyde resin, by applying the resin in an aqueous alkaline solution in a flow of air to the fibers. The wood fibers, carrying approximately 270 g of the dry resin per 730 g of dry wood chips, are dried with dry, hot air to a residual moisture content of approximately 7.5%.

The resin-coated dried wood fibers are distributed onto a conveyor belt and shaped while forming a web-like mat. The mat is densified under a pressure of approximately 15 bar and subsequently covered with a decorative foil on both sides, said foil consisting of a paper with a weight of 120 g/m$^2$, impregnated with 130% by weight (with respect to the weight of the paper) of a melamine-formaldehyde resin precondensate. The laminated material consisting of the mat and the decorative foil is conveyed to a press, during which, if necessary, the plate formats desired are obtained by the cutting of the mat before or after the press. After pressing for approximately 16 minutes at 140° C. and under a pressure of 80 bar, plates with a thickness of 12 mm are obtained.

EXAMPLE 2

Decorative plates are obtained by the process described in Example 1, by spraying approximately 235 g phenol-formaldehyde resin (solid) onto 765 g dry wood fibers.

The resin coated fibers are dried to a residual moisture content of approximately 8%.

The plates are 12 mm thick.

EXAMPLE 3

Decorative plates are prepared according to Example 1, with the use, in place of wood fibers, of cellulose fibers, which are impregnated with a phenol-formaldehyde resin. In the adhesive application process, 270 g resin are applied to 730 g of the fibers. The resin-coated fibers are dried to a residual moisture content of approximately 7.5% by weight. Following the formation and predensification of the fibrous mat, the latter is covered by the decorative foil described in Example 1 and conveyed into a press. Pressing is effected at 140° C. and 80 bar for 16 minutes. The plates obtained have a thickness of 12 mm.

EXAMPLE 4

A decorative plate is prepared according to Example 1. In place of wood fibers, pure cellulose fibers are impregnated with phenol-formaldehyde resin. After drying, the cellulose fibers have 235 g of the resin per 765 g of the cellulose fibers and a residual moisture content of 8%. The cellulose fibers are deposited to form a mat. The processing steps described in Example 1 are subsequently performed, wherein the mat is conveyed continuously, after densification and cutting to the plate size desired, together with the decorative foil applied to both sides, to a press and therein pressed for approximately 16 minutes at 140° C. and under a pressure of 90 bar. The plates obtained are 12 mm thick.

EXAMPLE 5

A decorative plate is prepared according to Example 1. In place of wood fibers, a mixture of pure cellulose fibers and softened wood fibers in a proportion of 8:1 is used. After impregnation with a phenol-formaldehyde resin and drying, the fibers contain 205 g resin per 795 g fibers. Subsequent processing steps are those set forth in Example 1. The plates are 12 mm thick.

EXAMPLE 6

In accordance with the process described in Example 1, wood particles are softened, beat into fibers, impregnated with resin and dried. After drying, the wood fibers have a resin content of 205 g per 795 g of the wood fibers.

The resin-coated wood fibers are deposited continuously in a tangled layer onto a horizontal conveyor belt and shaped into a web-like mat. the mat is densified by means of prepressing under a pressure of 15 bar and conveyed after trimming into plate-like formats continuously into a conveyor press. After pressing for 16 minutes at 140° C. and under a pressure of 80 bar, the plates obtained are coated on a coating line on both sides with a cross-linked acrylic resin and then placed into an oven at 120° C., wherein the resin hardens. The plates obtained are 12 mm thick.

EXAMPLE 7

Wood particles are softened, beat into fibers, impregnated with resin and dried according to the process described in Example 1. The wood fibers have after drying a resin content of 205 g per 795 g wood fibers.

The resin coated wood fibers are deposited continuously in a tangled layer onto a horizontal conveyor belt and shaped into a web-like mat. The mat is densified by prepressing under a pressure of 25 bar and is subsequently covered on both sides with a decorative layer having the following composition (in % by weight): melamine-formaldehyde resin (60), bleached cellulose fibers (31), coloring (1), titanium dioxide pigments (8).

The laminated body of the decorative layers and the densified mat is pressed in a stationary press for 16 minutes and at a temperature of 140° C., under a pressure of 80 bar. After pressing, the press is opened without recooling.

EXAMPLE 8

Loose wood fibers are coated for the preparation of non-flammable decorative plates with a phenol-formaldehyde resin modified with a melamine-formaldehyde phosphoric acid resin. In the process, 285 g of this resin are applied to 715 g wood fibers in a flow of air, and the wood fibers are subsequently dried to a residual moisture content of 8% by weight. A mat is formed of the resin coated fibers, which is covered on both sides with a decorative foil. The coated mat is pressed at 80 bar and 150° C. for 12 minutes after trimming.

The 12 mm thick plates were tested according to DIN 4102, Class B1 and satisfied the specifications of this class.

EXAMPLE 9

Wood fibers are resin-coated with a low molecular weight phenol-formaldehyde resin (PHENODUR 271, 105 g per 715 g wood fibers) and subsequently, without intermediate drying, with a high molecular weight phenol-formaldehyde resin (PHENODUR VPR 45, 180 g per 715 g fibers).

The material is further processed as described in Example 6 and provided with decorative layers of a cross-linked acrylic resin.

The plates are 5 mm thick.

EXAMPLE 10

Loose, dried wood fibers are initially resin coated in a flow of air with a mixture of polyol and diisocyanate. The amount of the mixture applied is 72 g per 714 g wood fibers.

Subsequently, a thermosetting phenol-formaldehyde resin is sprayed in an aqueous, alkaline solution onto the wood fibers. The amount of the phenol-formaldehyde resin applied is 214 g per 714 g wood fibers. The coated wood fibers are dried with dry air to a residual moisture content of about 7%.

The resin-coated, dried wood fibers are deposited onto a conveyor belt and shaped into a web-like mat. The mat is densified by prepassing under a pressure of 25 bar in the cold state and then covered on both sides with a decorative foil of Example 1.

The prepressed mat is pressed for 16 minutes and at a temperature of 150° C. under a pressure of 80 bar. A 12 mm thick decorative plate is obtained.

In the following table are listed the properties of the plates described in the Examples. Tests were effected after climatization (8 days, standard atmosphere).

To test the behavior of the plates during changing atmospheric conditions ( atmospheric change test), plates with dimensions of 20×20 cm are exposed ten cycles of 2 days each; every cycle includes storage at 20° C./65% relative himidity/12 hours, then 80° C./90% relative humidity/12 hours and then −20° C./12 hours.

The single FIGURE of drawing is a lateral elevation, cross-sectional view of a preferred embodiment of the molded article according to the invention. It consists of a fiber containing flat core 1 and two outer decorative layers 2.

TABLE

| Properties | | Test Method | Dimension | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Thickness | | DIN 52350 | mm | 12 | 12 | 12 | 12 | 12 | 12 | 12 | 12 | 5 | 12 |
| Density | | DIN 53479 | kg/m$^3$ | 1390 | 1390 | 1400 | 1400 | 1390 | 1380 | 1325 | 1390 | 1420 | 1390 |
| Bending | long. | DIN 53452 | N/mm$^2$ | 100 | 90 | 45 | 45 | 55 | 85 | 85 | 75 | 90 | 95 |
| Strength | trans. | | | 100 | 90 | 45 | 45 | 55 | 85 | 85 | 75 | 90 | 95 |
| Tensile | long. | DIN 53455 | N/mm$^2$ | 75 | 75 | 35 | 35 | 40 | 70 | 70 | 70 | 80 | 75 |
| Strength | trans. | | | 75 | 75 | 35 | 35 | 40 | 70 | 70 | 70 | 80 | 75 |
| Dimensional Stability (24 h.−70° C.) | long. | DIN 53799 | % | 0.14 | 0.15 | 0.10 | 0.10 | 0.14 | 0.12 | 0.13 | 0.10 | 0.34 | 0.12 |
| | trans. | | | 0.14 | 0.15 | 0.10 | 0.10 | 0.14 | 0.12 | 0.13 | 0.10 | 0.34 | 0.12 |
| Dimensional Stability | long. | ++ | % | 0.05 | 0.06 | 0.19 | 0.21 | 0.2 | 0.2 | 0.20 | 0.06 | 0.34 | 0.06 |
| | trans. | | | 0.05 | 0.06 | 0.19 | 0.21 | 0.2 | 0.2 | 0.20 | 0.06 | 0.34 | 0.06 |
| Water Uptake | | DIN 53799 | % | 0.4 | 0.5 | 0.3 | 0.4 | 0.6 | 0.6 | 0.5 | 0.3 | 0.8 | 0.5 |
| Swelling | | DIN 53799 | % | 1.7 | 1.7 | 1.0 | 1.1 | 1.5 | 1.5 | 1.4 | 1.0 | 2.5 | 1.4 |
| Climate Change Test | | See Specification | — | good+ | good | good | good | good | good | good | good | good | good |
| Xenon Test | | DIN 54004 | Step | 8 | 8 | 8 | 8 | 8 | 8 | 8 | 8 | 8 | 8 | good + = no bubble or crack forming
++ = 20° C., 7 days in water, specimen 20 cm long

What is claimed is:

1. A decorative molded article, comprising:
   a core of a fiber containing material comprised of wood or cellulose fibers which are coated with a thermosetting synthetic resin, said resin having been added to said fibers as an aqueous solution prior to heat-hardening of said resin, the content of said resin being between at least about 150 g and not more than about 900 g of resin per 1000 g of dry fibers; and
   a decorative layer on at least one surface of said core, wherein the density of the molded article is between about 900 and 1600 kg/m₃.

2. A molded article according to claim 1, wherein the resin content is between about 150 and 600 g of resin per 1000 g of dry fibers, and the density of the molded article is between about 1100 and 1500 kg/m$^3$.

3. A molded article according to claim 1, wherein said core contains up to about 50% by weight of organic synthetic fibers.

4. A molded article according to claim 1, wherein said thermosetting synthetic resin comprises a phenol-formaldehyde resin, a melamine-formaldehyde resin, an epoxy resin, a urea-formaldehyde resin, a cross-linkable acrylic resin, a polyurethane resin, an epichlorohydrin-polyaminopolyamide resin, an epichlorohydrin-polyamine-resin or an epichlorohydrin-polyamide resin.

5. A molded article according to claim 4, wherein said synthetic resin has a B-time of more than about 5 minutes (130° C.) prior to thermosetting.

6. A molded article according to claim 5, wherein said synthetic resin comprises a phenol-formaldehyde resin with a predominantly low molecular weight component, in combination with a phenol-formaldehyde resin with a high molecular weight proportion of polycondensate.

7. A molded article according to claim 1, wherein the thermosetting resin comprises a synthetic resin with a non-flammable additive.

8. A molded article according to claim 1, wherein said thermosetting resin comprises a synthetic resin which due to modifications in the molecular chain exhibits non-flammable properties.

9. A molded article according to claim 8, wherein said synthetic resin is a phosphoric acid-phenol-aminoresin, prepared by the heat-hardening of a mixture of a precondensed, not yet hardened resin comprising melamine-formaldehyde-phosphoric acid, di-cyandiamide-formaldehyde-phosphoric acid or urea-formaldehyde-phosphoric acid as the first component and a precondensed, not yet hardened phenol-formaldehyde resin as the second component.

10. A molded article according to claim 9, wherein 1 to 2% by weight of phosphorus, relative to the total resin content, are contained.

11. A molded article according to claim 1, wherein said core contains 100% to 40% by weight wood fibers, and the balance cellulose fibers.

12. A molded article according to claim 1, having the configuration of an essentially flat plate with a thickness of between about 0.5 to 30 mm.

13. A molded article according to claim 1, wherein said decorative layer comprises a fabric, formed fleece, a synthetic resin overlay, a paper overlay, a wood overlay or a layer of a coating.

14. A molded article according to claim 13, wherein said decorative layer comprises a decorative foil impregnated with a thermosetting resin comprising a melamine-formaldehyde resin applied with weight per unit area of from about 80 to 400 g/m$^2$.

15. A molded article according to claim 13, wherein said decorative layer comprises a cross-linked acrylic resin, a urethane resin, an epoxy resin, a melamine resin, or water glass.

16. A molded article according to claim 1, wherein said core contains up to about 50% by weight of pressed synthetic resin particles.

17. A construction panel suitable for exterior application comprising a molded article as defined in claim 1 in the form of a substantially flat plate.

18. A molded article according to claim 1, wherein said aqueous solution of said resin is an alkaline solution.

19. A molded article according to claim 1, wherein said molded article has a thickness between about 2 and 40 mm, a degree of water uptake of approximately 0.8% or less, and a degree of swelling of approximately 2.5% or less.

20. A construction panel according to claim 17, wherein said molded article has a thickness between about 2 and 40 mm, a degree of water uptake of approximately 0.8% or less, and a degree of swelling of approximately 2.5% or less.

21. A process for producing a molded article according to claim 1, comprising the steps of:
adding said wood or cellulose fibers to an aqueous solution of said thermosetting synthetic resin to coat said wood or cellulose fibers with from about 15 to 90% by weight of said thermosetting synthetic resin in an uncured state;
forming the coated fibers into a randomly deposited non-woven web-like mat;
predensifying the web-like mat; and
heating and pressing the predensified mat under conditions sufficient to harden said resin.

22. A process according to claim 21 further comprising the steps of softening wood chips with steam at a pressure of from about 1 to 10 bar, and comminuting the chips into fibers, and wherein said coating step comprises spraying said fibers with a resin solution or dispersion of the thermosetting resin.

23. A process according to claim 22, further comprising the step of treating the wood chips during or after the comminuting step with an alkaline formaldehyde solution under a pressure of from about 3 to 10 bar and at a temperature of from about 80° to 180° C., to produce a chemical reaction of the formaldehyde with the wood fibers.

24. A process according to claim 21, wherein said forming step comprises laying down the fibers provided with the resin in a tangled layer onto a moving conveyor belt.

25. A process according to claim 21, wherein said heating and compressing step comprises pressing the mat together with at least one decorative foil at a temperature between about 130° to 180° C. and a pressure of between about 30 to 100 bar.

26. A process according to claim 21, further comprising the step of applying at least one decorative layer to the surface of the molded article after said heating and pressing step.

27. A process according to claim 21, wherein said aqueous solution of said resin is an alkaline solution.

* * * * *